United States Patent Office 3,009,915
Patented Nov. 21, 1961

3,009,915
1,4,5,6-TETRAHYDRO-PIRIMIDYLMETHYL-ACETATES AND GLYCOLATES
Melville Sahyun and John A. Faust, Santa Barbara, Calif.; said Faust assignor to said Sahyun, doing business as Sahyun Laboratories, Santa Barbara, Calif.
No Drawing. Filed Oct. 1, 1958, Ser. No. 764,508
12 Claims. (Cl. 260—251)

This invention relates to the acid addition salts of organic amino esters and is more particularly concerned with the salts of tetrahydropyrimidylmethyl esters of halo-aryl and cycloalkyl-substituted acetic and glycolic acids.

The invention resides in the concept of a composition of matter having a molecular structure of an acid addition salt of an ester formed from an acetic acid or glycolic acid moiety, said acid moiety being halophenyl and cycloalkyl-substituted, and an alcohol moiety based on a tetrahydropyrimidylmethyl ring, which ring may be lower-alkyl substituted.

The physical embodiments of this invention concept exhibit applied use characteristics in that they possess parasympatholytic action, and are effective in controlling the spasticity, tremor and salivation produced by Tremorine (1,4-dipyrrolidine-2-butyne) in experimental animals which symptoms are strikingly similar to those of the human Parkinson's disease.

The free bases of the compounds of the present invention are tetrahydropyrimidylmethyl esters of substituted acetic or glycolic acid. The acid moiety must have two substituents, other than hydrogen or hydroxyl, on the alpha carbon atom. One of these required substituents is a halophenyl group (the halogen may be in any position on the phenyl ring); the other is a cycloalkyl group, e.g., cyclohexyl or cyclopentyl. The alcohol moiety is a 1,4,5,6-tetrahydro-pyrimidylmethyl group, wherein the 1 and 4 positions of the heterocyclic ring may be lower-alkyl substituted.

Thus the acid addition salts of the present invention have the following formula:

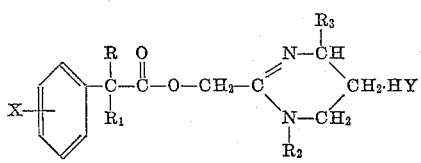

wherein

X is a halogen (preferably chlorine or bromine) substituted in any position of the phenyl ring;
R is hydrogen or hydroxyl;
$R_1$ is cyclohexyl or cyclopentyl;
$R_2$ is hydrogen or lower-alkyl; and
$R_3$ is hydrogen or lower-alkyl
Y is an anion The acid addition salts can be any of the usual stable, non-toxic acid addition salts. These acid addition salts are generally white, crystalline solids having relatively high melting points.

The ester compounds of the present invention may be prepared by first preparing the substituted acetic or glycolic acid corresponding to the acid moiety of the desired end-molecule and esterifying this acid with a halide salt of the alcohol moiety of the desired end-molecule.

The substituted acetic acid intermediate may be prepared by the following general route of synthesis: halotoluene (the halogen being that of the desired end molecule and substituted in the desired position on the phenyl ring) is brominated to produce alpha-bromo-halotoluene, which is then treated with a metallic cyanide forming halotolunitrile; this nitrile is reacted with cyclohexyl bromide (or cyclopentyl bromide) in the presence of sodamide and benzene to give alpha-cycloalkyl-halophenylacetonitrile, which upon alkaline hydrolysis yields alpha-cycloalkyl-halophenyl acetic acid.

The substituted glycolic acid intermediates may be prepared by the following general route of synthesis: halobenzoic acid (the particular halogen and its position on the ring being that desired in the end molecule) is reacted with thionyl chloride to form halobenzoyl chloride, which is then reacted with a metallic cyanide to form halobenzoyl cyanide, which latter is then treated with hydrochloric acid and water to form halobenzoylformic acid, which is then reacted with Grignard reagent (cycloalkyl magnesium bromide) and upon hydrolysis of the reaction mixture alpha-cycloalkyl-halo-phenylglycolic acid is formed.

The alcohol moiety of the desired end molecule is supplied by use of 2-chloromethyl-1,4,5,6-tetrahydropyrimidine hydrochloride, (or 1-lower alkyl and 3-lower alkyl substituted forms thereof where the tetrahydropyrimidine ring in the end molecule is to be so substituted.

The starting tetrahydropyrimidine hydrochloride containing compound is first neutralized, e.g., with sodium methylate solution (to liberate the free base) before it is added to the acid-moiety supplying material. The reaction is preferably conducted in the presence of an iodide salt, e.g., potassium iodide, as a reaction initiator and catalyst, and preferably in the presence of a solvent, e.g., isopropanol. Reaction is preferably conducted at reflux temperatures and requires some 4–15 hours for completion. After completion of the reaction, the solvent is removed from the reaction mixture which is treated with water and washed with ether. The aqueous solution is made alkaline and extracted with ether. The ether solutions contain the free base of the acid addition salts of the present invention. The ether solution is then treated with hydrogen chloride to form the hydrochloride salt or with the acid corresponding to whatever particular and addition salt may be desired. The acid addition salt so formed is recrystallized from a suitable organic solvent and obtained in pure crystalline form.

While, in the following examples, preparation of the hydrochloride salt is shown, it will be apparent that other acid addition salts can be formed therefrom in the usual manner by dissolving the hydrochloride salt in a suitable solvent, e.g., ether neutralizing the solution with an alkaline material, e.g., sodium hydroxide or potassium hydroxide and contacting the neutral solution with acid, e.g., hydrobromic, hydroiodic, nitric, phosphoric, sulphuric, acetic, citric, tartaric, lactic, paratoluenesulfonic, etc.

The following preparations are illustrative of certain of the intermediates used in preparing the compounds of the present invention, and of processses for the preparation of such types of intermediates, but are not to be construed as limiting.

PREPARATIONS

*Preparation 1.—2-chloromethyl-1,4,5,6-tetrahydropyrimidine hydrochloride*

A stirred solution of 7.5 grams (0.1 mole) of 1,3-diaminopropane in ninety milliliters of ethanol was cooled to zero degrees centigrade and 15.8 grams (0.1 mole) of ethyl chloroimidoacetate hydrochloride was added in portions during the course of one hour. After the mixture was stirred for two hours at zero degrees centigrade, it was acidified by the addition of 68 milliliters of two normal ethanolic hydrogen chloride, keeping the temperature at zero to five degrees centigrade. The mixture was allowed to warm to twenty degrees centigrade, and stirred for one hour, after which it was filtered. The filtrate was vacuum-distilled to a solid residue which was recrystallized from 25 milliliters isopropanol. The yield of 2-chloromethyl-1,4,5,6-tetrahydropyrimidine hydrochloride, as a crystalline solid melting at 202–207 degrees centigrade, was 8 grams (47 percent of the theoretical yield).

*Analysis.*—Calculated for $C_5H_9ClN_2 \cdot HCl$: N, 16.57. Found: N, 16.46.

*Preparation 2.—2-chloromethyl-4-methyl-1,4,5,6-tetrahydropyrimidine hydrochloride*

To a stirred solution of 8.8 grams (0.1 mole) of 1,3-diamino-butane in 150 milliliters of ethanol maintained at 0–5 degrees centigrade, there was added 15.8 grams (0.1 mole) of ethyl chloroimidoacetate hydrochloride during a period of 20 minutes. After the mixture had been stirred at 0–5 degrees centigrade for two hours, it was acidified at this temperature by the addition of ethanolic hydrogen chloride. The mixture was warmed to room temperature and filtered to remove 4.3 grams of solid ammonium chloride. The filtrate was concentrated to approximately 40 milliliters, filtered and refrigerated. The solid which separated was isolated, washed with acetone and dried. There was obtained 7.4 grams (40 percent of the theoretical yield) of 2-chloromethyl-4-methyl-1,4,5,6-tetrahydropyrimidine hydrochloride, melting at 158–160 degrees centigrade. A sample for analysis, melting at 173–174 degrees centigrade, was obtained by liberating the base, converting the base into the hydrochloride salt and recrystallizing the salt from alcohol-ether. The mother liquor was concentrated to an oil (8 grams) which partially solidified to a slush, and is sufficiently pure for use in subsequent esterifications.

*Analysis.*—Calculated for $C_6H_{11}ClN_2HCl$: N, 15.30. Found: N, 15.15.

*Preparation 3.—N-methyl-1,3-diaminopropane hydrochloride*

A solution of 40 grams (0.48) mole) of beta-methylaminopropionitrile in 100 milliliters of dry ether was added dropwise over a period of 2 hours to a stirred mixture of 27.4 grams (0.72 mole) of lithium aluminum hydride in 1500 milliliters of dry ether at room temperature. The mixture was stirred at room temperature for 18 hours after which it was cooled, and sufficient 40 percent sodium hydroxide was added to convert the inorganic salts to a white sludge. The ether was decanted from the sludge, and the sludge was extracted with fresh ether. Acidification of the combined ether solutions with excess ethereal hydrogen chloride precipitated 46 grams (58 percent of the theoretical yield) of N-methyl-1,3-diaminopropane hydrochloride, a crystalline solid melting at 189–191 degrees centigrade, after recrystallization from methanol-ether.

*Analysis.*—Calculated for $C_4H_{12}N_2 \cdot 2HCl$: N, 17.39. Found: N, 17.16.

The boiling point of the anhydrous free base is reported to be 138–141 degrees centigrade (J. Am. Chem. Soc., 68, 1217 [1946]).

*Preparation 4.—2-hydroxymethyl-1-methyl-1,4,5,6-tetrahydropyrimidine hydrochloride*

To a stirred solution of 30 grams (0.34 mole) of N-methyl-1,3-diaminopropane in 300 milliliters of ethanol maintained at 0–10 degrees centigrade there was added 47 grams (0.34 mole) of ethyl glycolimidate hydrochloride over a period of 2 hours. The mixture was stirred at ice-bath temperature for two hours and then at room temperature for two hours. The mixture was thereafter vacuum-distilled to remove most of the ammonia, acidified with ethanolic hydrogen chloride and filtered. The filtrate was concentrated to a small volume, filtered and diluted with ether to precipitate the crystalline product. A second crop was obtained from the mother liquor by further dilution with ether. There was thus obtained 34 grams (60 percent of the theoretical yield) of 2-hydroxymethyl-1-methyl-1,4,5,6-tetrahydropyrimidine hydrochloride melting at 144–149 degrees centigrade. Repeated crystallization from alcohol-ether raised the melting point to 164–165 degrees centigrade.

*Preparation 5.—2-chloromethyl-1-methyl-1,4,5,6-tetrahydropyrimidine hydrochloride*

Three grams of 2-hydroxymethyl-1-methyl-1,4,5,6-tetrahydropyrimidine hydrochloride were added in small portions to 10 milliliters of thionyl chloride containing one drop of pyridine at room temperature. The solid dissolved almost immediately, and the solution was warmed at 45–50 degrees centigrade for one hour, after which it was vacuum distilled from a 50 degrees centigrade bath. The residual oil was dissolved in isopropanol, the solution was treated with charcoal and filtered and the filtrate was vacuum distilled at about 50 degrees centigrade to remove the solvent. The residue, 2-chloromethyl - 1 - methyl - 1,4,5,6 - tetrahydropyrimidine hydrochloride, was clear, pale amber oil and was used as such.

*Preparation 6.—Alpha-cyclopentyl-p-chlorophenylglycolic acid*

To a stirred Grignard reagent prepared from 6.0 grams (0.25 g. at.) of magnesium, 37.2 grams (0.25 mole) of cyclopentylbromide, and 200 milliliters of dry ether was added a solution of 18.5 grams (0.1 mole) of p-chlorobenzoylformic acid in 100 milliliters of benzene-ether, 1:1 over a period of 1.5 hours at 0–5 degrees centigrade. The mixture was stirred for an additional 1 hour at room temperature, refluxed for 30 minutes, and hydrolyzed at 0–10 degrees centigrade with 50 milliliters of dilute hydrochloric acid solution. It was necessary to warm the mixture to decompose some solid material. The organic layer was separated, washed with 25 milliliters of water, and the solvent removed to yield a solid residue. The residue was taken up in 150 milliliters of 10 percent sodium hydroxide solution, washed with 25 milliliters of ether, and acidified. The solid which separated was recrystallized from acetic acid-water to yield 3.0 grams (12 percent) of the acid melting at 115–116 degrees centigrade. An additional 3.7 grams of the product melting at 113–115 degrees centigrade was recovered from the filtrate.

*Analysis.*—Calculated for $C_{13}H_{15}O_3Cl$: Neut. equiv., 254.7. Found: Neut. equiv., 258.

*Preparation 7.—Alpha-cyclohexyl-m-chlorophenylacetonitrile*

Bromination of m-chlorotoluene by the process of J.C.S., 1927, 2241, afforded a 56 percent yield of alpha-bromo-m-chlorotoluene which boiled at 125–135 degrees centigrade (27 mm.). This latter compound was reacted with sodium cyanide according to the process of CA, 46, 11149, and an 80 percent yield of m-chlorotolunitrile, boiling point 93–100 degrees centigrade (1 mm.) was obtained.

Following the procedure described in Preparation 10 (for alpha-cyclohexyl-p-chlorophenylacetonitrile) equimolar quantities of m-chlorotolunitrile, cyclohexyl bromide and sodamide in benzene gave a 45 percent yield of alpha-cyclohexyl-m-chlorophenylacetonitrile, boiling point 153–155 degrees centigrade (1.5 mm.).

*Analysis.*—Calculated for $C_{14}H_{16}ClN$: N, 5.99. Found: N, 6.23.

*Preparation 8.—Alpha-cyclohexyl-m-chlorophenylacetic acid*

Hydrolysis of the nitrile of Preparation 7 with sodium hydroxide in aqueous propylene glycol by the general procedure described for the corresponding p-chloro compound in Preparation 11, resulted in a 78 percent yield of the acid melting at 133–135 degrees centigrade after recrystallization from acetic acid.

*Analysis.*—Calculated for: $C_{14}H_{17}ClO_2$: Neut. equiv., 253. Found: Neut. equiv., 251.

*Preparation 9.—Alpha-cyclohexyl-p-chlorophenylglycolic acid*

To a stirred Grignard reagent prepared from 50.0 grams [0.306 mole] of cyclohexylbromide, 7.3 grams [0.306 gram atom] of magnesium, and 250 milliliters of dry ether was added a solution of 15.0 grams [0.082 mole] of p-chlorophenylglyoxylic acid in 50 milliliters of ether-benzene, 1:1, over a period of 1 hour at 0–5 degrees centigrade. The mixture was stirred an additional hour at ice-bath temperature, 1 hour at room temperature, and refluxed for 30 minutes. The mixture was then hydrolyzed at room temperature with 50 milliliters of dilute hydrochloric acid; the organic layer was separated and washed with 20 milliliters of water. Upon removal of the organic solvent, a solid residue was obtained which was taken up in 200 milliliters of 10 percent sodium hydroxide solution. The aqueous extract was washed with 25 milliliters of ether and carefully acidified. The solid which separated upon acidification was recrystallized from benzene to yield 5.2 grams [24 percent] of the acid melting at 184–186 degrees centigrade. A sample of alpha-cyclohexyl-p-chlorophenylglycolic acid for analysis was recrystallized again from heptane-benzene, 10:1, and melted at 187–188 degrees centigrade.

*Analysis.*—Calculated for $C_{14}H_{17}O_3Cl$: Neut. equiv., 269. Found: Neut. equiv., 265.

*Preparation 10.—Alpha-cyclohexyl-p-chlorophenylacetonitrile*

To a stirred suspension of 12.0 grams [0.31 mole] of sodamide in 200 milliliters of benzene was added dropwise a solution of 45.4 grams [0.30 mole] of p-chlorophenylacetonitrile in 50 milliliters of benzene at ice-bath temperature. After the addition was completed, the reaction mixture was stirred for an additional 2 hours at room temperature. A solution of 47.0 grams (0.29 mole) of cyclohexylbromide in 25 milliliters of benzene was then added over a period of 1 hour, and the mixture was heated at 65–70 degrees centigrade for 4 hours. Fifty milliliters of water was added; and the organic layer was separated, dried over magnesium sulfate, and distilled to yield 28.4 grams (42 percent) of alpha-cyclohexyl-p-chlorophenylacetonitrile, boiling at 165–167 degrees centigrade at 2.1–2.2 millimeters.

*Analysis.*—Calculated for $C_{14}H_{16}ClN$: N, 5.99. Found: N, 5.68.

*Preparation 11.—Alpha-cyclohexyl-p-chlorophenylacetic acid*

Twenty-eight and four-tenths gram (0.12 mole) of alpha-cyclohexyl-p-chlorophenylacetonitrile, 350 milliliters of propylene glycol, and 100 milliliters of 50 percent sodium hydroxide solution was refluxed for 15 hours. The hydrolysis mixture was concentrated to near dryness, diluted with 500 milliliters of water, filtered, and acidified to yield 28.0 grams of solid melting over a range of 130–140 degrees centigrade. Recrystallization of the solid from heptane yielded 18.3 grams (59 percent) of alpha-cyclohexyl-p-chlorophenylacetic acid melting at 151–152 degrees centigrade.

*Analysis.*—Calculated for $C_{14}H_{17}O_2Cl$: Neut. equiv., 252.7. Found: Neut. equiv., 254.

*Preparation 12.—o-Chlorobenzoyl chloride*

To 100 grams (0.64 mole) of o-chlorobenzoic acid moistened with 50 milliliters of chloroform was added 160 grams (1.34 mole) of thionyl chloride at room temperature. After adding two drops of pyridine, the resulting mixture was refluxed for 3 hours. The solvent and excess thionyl chloride was removed and the residue distilled to yield 87.0 grams (78 percent) of o-chlorobenzoyl chloride boiling at 86–87 degrees centigrade at 4.5 millimeters.

*Preparation 13.—o-Chlorobenzoyl cyanide*

A mixture consisting of 87.0 grams (0.5 mole) of o-chlorobenzoyl chloride and 44.0 grams (0.5 mole) of cuprous cyanide which was previously dried for 3 hours at 110 degrees centigrade was heated slowly over a 40 minute period to 200 degrees centigrade and held for 1 hour with occasional shaking. The temperature was then lowered to 150 degrees centigrade over a 30 minute period and the reaction mixture was distilled under reduced pressure. The crude distillate was redistilled to yield 41.0 grams (49 percent) of the nitrile boiling at 101–105 degrees centigrade at 1.5–1.6 millimeters.

*Preparation 14.—o-Chlorophenylglyoxylic acid*

A suspension of 41.0 grams (0.25 mole) of o-chlorobenzoyl cyanide in 600 milliliters of concentrated hydrochloric acid was allowed to remain at room temperature for 1 week. A portion of the solid had failed to react, and therefore the mixture was refluxed for 6 hours. A homogeneous solution had been obtained after the initial 1 hour of heating. The reaction mixture was poured into 1 liter of water and extracted with three 300 milliliter portions of ether. The residual oil obtained upon removal of the ether solidified when dried over solid potassium hydroxide and phosphorous pentoxide. The solid was recrystallized from benzene to yield 28.0 grams (61 percent) of the acid melting at 112–114 degrees centigrade. A small sample for analysis was recrystallized again from benzene and melted at 113–115 degrees centigrade.

*Analysis.*—Calculated for $C_8H_5ClO_3$: Neut. equiv. 184. Found: Neut. equiv., 183.

*Preparation 15.—Alpha-cyclopentyl-o-chlorophenylglycolic acid*

To a stirred Grignard reagent prepared from 44.7 grams (0.3 gram atom) of magnesium, and 200 milliliters of dry ether was added a solution of 18.5 grams (0.10 mole) of o-chlorophenylglyoxylic acid in 100 milliliters of benzene-ether, 1:1, over a period of 40 minutes at 0–5 degrees centigrade. A gummy material had precipitated before the addition was completed. The mixture was stirred for 1 hour at room temperature and was refluxed for 20 minutes. Seventy-five milliliters of dilute hydrochloric acid was then added dropwise at room temperature to hydrolyze the mixture. The organic layer was separated and washed with 25 milliliters of water. The solvent was removed to yield an oil which was digested with 150 milliliters of 20 percent sodium carbonate solution. The aqueous extract was washed with 25 milliliters of ether, treated with charcoal, and carefully acidified. The low melting solid obtained upon acidification weighed 13.7 grams, the melt of which is a dark colored gum. Fractional crystallization of the gum from acetic acid-water yielded 4.0 grams (16 percent) of cream colored needles melting at 90–92 degrees centigrade. A small sample for analysis was recrystallized again from acetic acid-water to yield white needles melting at 90–92 degrees centigrade.

*Analysis.*—Calculated for $C_{13}H_{15}ClO_3$: Neut. equiv., 255. Found: Neut. equiv., 252.

*Preparation 16.—m-Bromobenzoyl cyanide*

A mixture consisting of 50.0 grams (0.228 mole) of m-bromobenzoyl chloride and 21.0 grams (0.234 mole) of cuprous cyanide which had been dried for 3 hours at 110 degrees centigrade was heated at 200 degrees centigrade for 1.5 hours. A mild vacuum was applied directly to the reaction flask, and the crude distillate which was collected was redistilled to yield 24.2 grams (50 percent) of the nitrile product boiling at 96–99 degrees centigrade at 2.5–3 millimeters.

*Preparation 17.—m-Bromophenylglyoxylic acid*

A suspension of 35.0 grams (0.166 mole) of m-bromobenzoyl cyanide in 500 milliliters of concentrated hydrochloric acid was stirred vigorougsly at room temperature for approximately 24 hours. The reaction mixture was poured into 1 liter of water and extracted with three 300 milliliter portions of ether. Removal of the ether gave a mushy residue which was treated with 250 milliliters of 10 percent sodium carbonate solution, filtered, and the filtrate was carefully acidified. The solid which separated was recrystallized from heptanebenzene (10:1) to yield 23.0 grams (60 percent) of the acid product melting at 53–55 degrees centigrade.

Neut. equiv., calculated for $C_8H_5BrO_3$: 229. Found: 226.

*Preparation 18.—Alpha-cyclopentyl-m-bromophenylglycolic acid*

To a stirred solution of 22.9 grams (0.1 mole) of m-bromophenylglyoxylic acid in 100 milliliters of ether was added a Grignard reagent prepared from 45.0 grams (0.3 mole) of cyclopentyl bromide, 7.2 grams (0.3 gram atom) of magnesium, and 150 milliliters of ether at −5–0 degrees centigrade over a 40 minute period. The reaction mixture was refluxed for 1.5 hours and carefully hydrolyzed with 50 milliliters of dilute hydrochloric acid. The aqueous layer was washed with 50 milliliters of ether. Removal of the ether from the combined ethereal solution gave an oil which was digested with 75 milliliters of 10 percent potassium hydroxide solution. The aqueous extract was washed with 50 milliliters of ether, diluted to 200 milliliters, and treated with charcoal. An oil was obtained upon acidification which was used as such after preliminary attempts to obtain a crystalline solid were without success.

*Preparation 19.—m-Chlorobenzoyl cyanide*

A mixture of 97 grams (0.5 mole) of m-chlorobenzoyl chloride (Beilstein, IX, 338) and 53 grams (0.6 mole) of cuprous cyanide, which had been dried at 110 degrees centigrade for 3 hours, was heated at 200 degrees centigrade for 3 hours. Vacuum was applied and the crude cyanide was distilled from the mixture. It was then redistilled to obtain 72 grams of material boiling at 63–66 degrees centigrade (0.7 millimeters). The distillate solidified and was recrystallized from heptane. Yield 60 grams (66 percent), M.P. 35–37 degrees centigrade.

*Analysis.*—Calculated for $C_8H_4ClNO$: N, 8.46. Found: N, 8.43.

*Preparation 20.—m-Chlorobenzoylformic acid*

A suspension of 45 grams (0.27 mole) of m-chlorobenzoyl cyanide in 1.2 liters of 36 percent hydrochloric acid was stirred at room temperature for 2 days, then allowed to stand for 5 days, with occasional shaking. The mixture which contained an appreciable amount of solid was diluted to 3 liters with ice water and the mixture was extracted with four 500 milliliter portions of ether. The combined ether extracts were evaporated to a solid residue which was stirred in 500 centimeters of dilute sodium bicarbonate solution. The insoluble solid (27 grams) was filtered off, and the filtrate was acidified to precipitate 19 grams of the desired acid, melting point 63–64 degrees centigrade after recrystallization from benzene. The 27 grams of sodium bicarbonate-insoluble solid, which was presumably crude amide, was suspended in 200 milliliters of water, 50 milliliters of 40 percent sodium hydroxide was added and the solution was refluxed for 3 hours. The cooled solution was acidified to precipitate 20 grams of the acid, melting point 63–64 degrees centigrade after recrystallization from benzene.

Total yield of m-chlorobenzoylformic acid was 39 grams (78 percent).

*Analysis.*—Calculated for $C_8H_5ClO_3$: Neut. equiv., 185. Found: Neut. equiv., 189.

*Preparation 21.—Alpha-cyclopentyl-m-chlorophenylglycolic acid*

A Grignard reagent, prepared from 5.8 grams (0.24 gram atom) of magnesium, 35.8 grams (0.24 mole) of cyclopentyl bromide and 300 milliliters of ether, was stirred at 0–5 degrees centigrade while a solution of 18.5 grams (0.1 mole) of the m-chlorobenzoylformic acid in 150 milliliters of ether was added over a period of 1.25 hours. The mixture was stirred at 10 degrees centigrade for an additional hour and then refluxed for 0.5 hour, after which dilute hydrochloric acid was added. The layers were separated and the ether layer was extracted with dilute sodium hydroxide solution. The alkaline solution was treated with charcoal, filtered and acidified. The oil which separated was extracted with ether, the ether solution was dried over anhydrous magnesium sulfate and distilled to an oil weighing 16 grams. Its neutralization equivalent was 242 in comparison with the theoretical value of 255.

*Preparation 22.—N-benzylmethylaminomethyl acetone*

A cooled solution of 121 grams (1 mole) of benzylmethylamine in 500 milliliters of acetone was acidified with a mixture of 86 milliliters (1 mole) of 36 percent hydrochloric acid in 100 milliliters of acetone. To the mixture, from which benzylmethylamine hydrochloride had separated, was added 45 grams (1.5 mole) of paraformaldehyde and 100 milliliters of isopropanol. The mixture was refluxed for 6 hours and distilled to an oily residue which was dissolved in 100 milliliters of water. The solution was made strongly alkaline with sodium hydroxide and the liberated oily base was extracted with ether. Fractionation of the dried extract yielded 146 grams (77 percent) of a water white distillate, B.P., 124–128 degrees centigrade (2.5–3 mm.).

*Analysis.*—Calculated for $C_{12}H_{17}NO$: Neut. equiv., 191. Found: Neut. equiv., 188.

*Preparation 23.—N-benzylmethylaminomethyl acetone oxime*

A solution of 19.1 grams (0.1 mole) of the Mannich base, N-benzylmethyl-aminomethyl acetone, in 25 milliliters of isopropanol was combined at room temperature with a solution of 7 grams (0.1 mole) of hydroxylamine hydrochloride in 25 milliliters of water. The reaction was slightly exothermic and after 1.5 hours at room temperature, the mixture was distilled to remove the alcohol. The residue was dissolved in water, the solution was made alkaline with sodium hydroxide and the oxime base was extracted with ether. The ether was removed and the residue was distilled. Yield, 17 grams (83 percent); B.P., 161–164 degrees centigrade (2.5–3 millimeters).

*Analysis.*—Calculated for $C_{12}H_{18}N_2O$: Neut. equiv., 206. Found: Neut. equiv., 209.

*Preparation 24.—N-benzylmethyl-1,3-diaminobutane*

Sodium (150 grams, 6.6 gram atoms) was added to a refluxing solution of 114 grams (0.55 mole) of N-benzylmethylaminomethyl acetone oxime during a 45-minute period. As soon as the sodium had reacted, a liter of water was added and the solution was distilled to a volume of approximately one liter. The oil which separated was extracted with ether, and the ether solution was dried over potassium hydroxide and fractionated. Yield, 54 grams (51 percent); B.P., 114–116 degrees centigrade (2.5 millimeters).

The reduction of the oxime was also accomplished with lithium aluminum hydride in about the same yield.

*Analysis.*—Potentiometric titration showed inflection points at pH 7.5 and 3.9. Calculated for $C_{12}H_{20}N_2$: Eq. wt., 96. Found: Eq. wt., 99.

*Preparation 25.—N-methyl-1,3-diaminobutane dihydrochloride*

A solution of 27 grams (0.14 mole) of N-benzyl-methyl-1,3-diaminobutane in 150 milliliters of ethanol containing 30 milliliters of glacial acetic acid was hydrogenated at an initial pressure of 48 pounds per square inch over 5 percent palladium on charcoal. The calculated amount of hydrogen was absorbed in about 2 hours at room temperature. Two such charges were run, combined and filtered to remove the catalyst. Removal of the solvent left an oily residue which was dissolved in water, the solution was made strongly alkaline and the liberated amine base was steam distilled from the mixture and collected in hydrochloric acid. About 2 liters of distillate was collected and concentrated to an oil, the last stages of the concentration being done under vacuum. The oily resdue, after being dried by distilling fresh portions of isopropanol from it, became a solid and was recrystallized from methanol. A second crop was obtained by dilution with acetone. Total yield, 33 grams (72 percent); M.P., 182–183 degrees centigrade (analytical sample, recrystallized from methanol-ether).

*Analysis.*—Calculated for $C_5H_{14}N_2 \cdot 2HCl$: N, 16.00; Cl, 40.5. Found: N, 15.87; Cl, 38.2.

The mono hydrochloride of this diamine, prepared by a different series of reactions, is reported to melt at 223 degrees centigrade (J.A.C.S., 38, 1854 (1916)).

*Preparation 26.—1,4-dimethyl-2-hydroxymethyl-1.4.5.6-tetrahydropyrimidine hydrochloride*

To a stirred solution of 32 grams (0.183 mole) of the N-methyl-1,3-diaminobutane dihydrochloride in 400 milliliters of methanol was added 140 milliliters (0.366 mole) of 2.62 N sodium methylate in methanol. The mixture was cooled to 0–5 degrees centigrade and then refluxed for 2 hours after which it was filtered and concentrated to one-half volume. The solution was acidified with ethanolic hydrogen chloride and stripped in vacuum to an oil containing some solid. The mixture was taken up in boiling isopropanol, filtered and vacuum distilled to a clear, pale greenish-yellow oil weighing 36 grams. Many attempts failed to crystallize this oil, and it was used as such in the subsequent step of Preparation 27.

*Preparation 27.—1,4-dimethyl-2-chloromethyl-1.4.5.6-tetrahydropyrimidine hydrochloride*

The hydroxymethyl compound of Preparation 26 was combined (36 grams) with 60 milliliters of thionyl chloride and the mixture was refluxed for 30 minutes. It was cooled, filtered and distilled in vacuum to remove the excess thionyl chloride. The brown oily residue was dissolved in isopropanol, the solution was treated with charcoal and the alcohol was removed under vacuum. There was obtained 39 grams of a brown oil which could not be made to crystallize.

Following the procedure of the preceding preparations substituted acetic and glycolic acids wherein the halogen is bromine, chlorine, iodine or fluorine substituted in any position on the phenyl ring can be prepared by starting with the correspondingly substituted halo-substituted phenyl containing starting compound.

Thus by starting with o-bromobenzoyl chloride and p-bromobenzoyl chloride in place of m-bromobenzoyl chloride in Preparation 16 and following the procedure of Preparations 16–18, there was obtained alpha-cyclopentyl-o-bromophenylglycolic acid and alpha-cyclopentyl-p-bromophenylglycolic acid, respectively; and by substituting cyclohexyl bromide for cyclopentyl bromide in Preparation 18, there was obtained alpha-cyclohexyl-m-bromophenylglycolic acid, alpha-cyclohexyl-o-bromophenylglycolic acid, and alpha-cyclohexyl-p-bromophenylglycolic acid. The corresponding iodine and fluorine-containing acids were prepared in the same manner by starting with the appropriately substituted starting material.

Also following the procedure of Preparations 7 and 8 or 10 and 11, but starting with o, m, or p-bromotoluene (or corresponding iodo- or fluoro-toluenes) there was obtained alpha-cyclohexyl-o-(m- or p-)-bromophenylacetic acid (or corresponding iodo or fluorine-containing acids). And by substituting cyclopentyl bromide for cyclohexyl bromide in Preparations 7 and 10, the corresponding alpha-cyclopentyl compounds were made.

By following the procedure of Preparations 22–27, 2-chloromethyl-1,4,5,6-tetrahydropyrimidine hydrochloride, in which the 1 or 4 (or both) positions on the pyrimidine ring are substituted by any desired lower-alkyl [$C_{1-5}$] group can be prepared by appropriate choice of obvious starting materials containing the desired lower-alkyl in place of the methyl substituents of the preparations.

The following examples are given to illustrate the compounds included within the present invention, and to teach the general processes by which they may be prepared, but they are not to be construed as limiting the invention thereto.

EXAMPLES

*Example 1.—1-methyl-1,4,5,6-tetrahydro-2-pyrimidyl-methyl alpha-cyclopentyl-p-chlorophenylglycolate hydrochloride*

An isopropanol solution of 3.7 grams (0.02 mole) of 1-methyl-2-chloromethyl-1,4,5,6-tetrahydropyrimidine hydrochloride was neutralized with 12.7 milliliters of 1.57 N (0.02 mole) of sodium methylate solution and filtered into a solution of 5.1 grams of alpha-cyclopentyl-p-chlorophenylglycolic acid, in 25 milliliters of isopropanol. About 0.1 gram of powdered potassium iodide was added and the mixture was refluxed for 4.75 hours. The solvent was removed, and the residue was digested with 100 milliliters of dilute hydrochloric acid. The aqueous extract was washed with ether, made strongly basic, and extracted with four 50 milliliter portions of ether. The ether extract was dried over potassium carbonate and acidified. The solid which separated was recrystallized from isopropanol-ether to yield 0.35 gram (4.4 percent) of 1-methyl-1,4,5,6-tetrahydro-2-pyrimidylmethyl alpha-cyclopentyl-p-chlorophenylglycolate hydrochloride, as a white crystalline solid melting with decomposition at 218–219 degrees centigrade.

*Analysis.*—Calculated for $C_{19}H_{25}ClN_2O_3 \cdot HCl$: N, 6.98; Cl$^-$, 8.83. Found: N, 7.02; Cl$^-$, 8.71.

*Example 2.—1,4-dimethyl-1,4,5,6-tetrahydro-2-pyrimidylmethyl alpha-cyclopentyl-p-chlorophenylglycolate hydrochloride*

A solution of 1.3 grams (0.0066 mole) of 1,4-dimethyl-2-chloromethyl-1,4,5,6-tetrahydropyrimidine hydrochloride in 25 milliliters of isopropanol was neutralized with 2.56 milliliters of 2.62 N (0.0066 mole) sodium methylate solution and filtered into a solution of 1.8 grams (0.0071 mole) of alpha-cyclopentyl-p-chlorophenylglycolic acid in 25 milliliters of isopropanol. About 0.1 gram of potassium iodide was added and the resulting mixture refluxed for 12 hours. The solvent was removed, and the resulting oil was digested with 50 milliliters of dilute acid. The aqueous extract was washed with ether, made strongly basic, and extracted with three 50 milliliter portions of ether. The ether extract was dried over potassium carbonate and acidified to precipitate a solid which gave 0.15 gram (5.5 percent) of the ester 1,4-dimethyl-1,4,5,6-tetrahydro-2-pyrimidylmethyl alpha-cyclopentyl-p-chlorophenylglycolate hydrochloride, melting with decomposition at 196–197 degrees centigrade after recrystallization from isopropanol-ether.

*Analysis.*—Calculated for $C_{20}H_{27}ClN_3O_3 \cdot HCl$: N, 6.75. Found: N, 6.49.

*Example 3.—1-methyl-1,4,5,6-tetrahydro-2-pyrimidylmethyl alpha cyclohexyl-m-chlorophenylacetate hydrochloride*

Equimolar quantities (0.02 mole) of alpha-cyclohexyl-m-chlorophenylacetic acid and 1-methyl-1,4,5,6-tetrahydropyrimidine (liberated in the usual manner from the hydrochloride) were combined with 50 milliliters of isopropanol and refluxed for 6 hours. The solution was distilled to an oil which was partitioned between water and ether. The aqueous solution was made alkaline and extracted with ether. Treatment of the ether solution with hydrogen chloride precipitated an oil which was dissolved in isopropanol, treated with charcoal and diluted with a large volume of ether. The ester hydrochloride separated as clusters of tiny white needles. Yield, 3 grams, melting point 178–179 degrees centigrade.

*Analysis.*—Calculated for $C_{20}H_{27}ClN_2O_2 \cdot HCl$: N, 7.02; Cl$^-$, 8.88. Found: N, 7.03; Cl$^-$ 9.00.

*Example 4.—1,4-dimethyl-1,4,5,6-tetrahydro-2-pyrimidylmethyl alpha-cyclohexyl-p-chlorophenylglycolate hydrochloride*

A solution of 1.5 grams (0.075 mole) of 2-chloromethyl-1,4-dimethyl-1,4,5,6-tetrahydropyrimidine hydrochloride in 25 milliliters of isopropanol was neutralized with 2.86 milliliters of 2.62 N (0.0075 mole) sodium methylate solution and filtered into a solution of 2.0 grams (0.0075 mole) of alpha-cyclohexyl-p-chlorophenylglycolic acid in 25 milliliters of isopropanol. After adding about 0.1 gram of powdered potassium iodide, the mixture was refluxed for 15 hours. The solvent was removed to yield an oily residue which was digested with 200 milliliters of dilute hydrochloric acid (5 percent). The aqueous extract was washed with 25 milliliters ether, made strongly basic, and extracted with four 25 milliliter portions of ether. The ether extract was dried over potassium carbonate and acidified with ethereal hydrogen chloride. The solid which separated was recrystallized from ethanol-ether to yield 0.5 gram (15 percent) of the basic ester hydrochloride as a white, crystalline solid melting with decomposition at 217–218 degrees centigrade.

*Analysis.*—Calculated for $C_{21}H_{29}ClN_2O_3 \cdot HCl$: N, 6.52. Found: N, 6.55.

*Example 5.—1-methyl-1,4,5,6-tetrahydro-2-pyrimidylmethyl alpha cyclohexyl-p-chlorophenylglycolate hydrochloride*

A solution of 1.8 grams (0.01 mole) of 2-chloromethyl-1-methyl-1,4,5,6-tetrahydropyrimidine hydrochloride in 25 milliliters of isopropanol was neutralized with 3.9 milliliters of 2.59 N (0.01 mole) sodium methylate solution and filtered into a solution of 2.5 grams (0.01 mole) of alpha-cyclohexyl-p-chlorophenylglycolic acid in 25 milliliters of isopropanol. After adding about 0.1 gram of powdered potassium iodide, the mixture was refluxed for 15 hours. The solution was then concentrated to approximately 25 milliliters whereupon a solid began to separate. The solid was isolated and recrystallized twice from ethanol-ether to yield 1.6 grams (38 percent) of the basic ester hydrochloride as a white, crystalline solid melting with decomposition at 231–232 degrees centigrade.

*Analysis.*—Calculated for $C_{20}H_{27}ClN_2O_3 \cdot HCl$: N, 6.75; Cl$^-$, 8.53. Found: N, 6.85; Cl$^-$, 8.39.

*Example 6.—4-methyl-1,4,5,6-tetrahydro-2-pyrimidylmethyl alpha cyclohexyl-p-chlorophenylacetate hydrochloride*

A solution of 3.7 grams (0.02 mole) of 2-chloromethyl-4-methyl-1,4,5,6-tetrahydropyrimidine hydrochloride in 50 milliliters of isopropanol was neutralized with 7.7 milliliters of 2.59 N (0.02 mole) sodium methylate solution and filtered into a solution of 5.0 grams (0.02 mole) of alpha-cyclohexyl-p-chlorophenylacetic acid in 25 milliliters of isopropanol. After adding about 0.1 gram of potassium iodide, the mixture was refluxed for 15 hours, treated with charcoal, and concentrated to approximately 50 milliliters, whereupon a solid began to separate. Two recrystallizations of the solid from ethanol yielded 2.5 grams (31 percent) of the ester hydrochloride as white platelets, melting with decomposition at 253–254 degrees centigrade.

*Analysis.*—Calculated for $C_{20}H_{27}ClN_2O_2 \cdot HCl$: N, 7.02; Cl$^-$, 8.88. Found: N, 7.04; Cl$^-$, 8.68.

*Example 7.—1-methyl-1,4,5,6-tetrahydro-2-pyrimidylmethyl alpha-cyclopentyl-o-chlorophenylglycolate hydrochloride*

A solution of 2.8 grams (0.0142 mole) of 2-chloromethyl-1-methyl-1,4,5,6-tetrahydropyrimidine hydrochloride in 25 milliliters of isopropanol was neutralized with 8 milliliters of 1.77 N (0.0142 mole) of sodium methylate solution and filtered into a solution of 3.7 grams (0.0145 mole) of alpha-cyclopentyl-o-chlorophenylglycolic acid in 50 milliliters of isopropanol. After adding about 0.1 gram of potassium iodide, the mixture was refluxed for 15 hours. An oil was obtained upon removal of the solvent which solidified when triturated with dry ether. The solid was washed well with 25 milliliters of isopropanol-ether, 1:1, and recrystallized twice from ethanol-ether to yield 2.0 grams (35 percent) of the basic ester hydrochloride as a white, crystalline solid, melting with decomposition at 224–225 degrees centigrade.

*Analysis.*—Calculated for $C_{19}H_{25}ClN_2O_3 \cdot HCl$: N, 6.98; Cl$^-$, 8.83. Found: N, 6.75; Cl$^-$, 8.73.

*Example 8.—1-methyl-1,4,5,6-tetrahydro-2-pyrimidylmethyl alpha cyclohexyl-p-chlorophenylacetate hydrochloride*

A solution of 2.75 grams (0.015 mole) of 2-chloromethyl-1-methyl-1,4,5,6-tetrahydropyrimidine hydrochloride in 25 milliliters of isopropanol was neutralized with 8.5 milliliters of 1.77 N methanolic sodium methylate and filtered into a solution of 3.8 grams (0.015 mole) of alpha-cyclohexyl-p-chlorophenylacetic acid in 75 milliliters of isopropanol. To the resulting solution was added 0.1 gram of potassium iodide and the mixture was refluxed for 6 hours, the last 30 minutes of which was in the presence of charcoal. The hot mixture was filtered and the filtrate was distilled to an oily residue. The oil was partitioned between water and ether and the aqueous solution was made alkaline with sodium hydroxide. The liberated oily ester base was extracted with ether, the ether solution was dried over anhydrous magnesium sulfate and treated with ethereal hydrogen chloride. The precipitated ester hydrochloride (1.4 grams) was recrystallized from isopropanol as a white, crystalline solid melting at 190–192 degrees centigrade.

*Analysis.*—Calculated for $C_{20}H_{27}ClN_2O_2 \cdot HCl$: N, 7.02; Cl$^-$, 8.88. Found: N, 7.15; Cl$^-$, 8.83.

*Example 9.—1,4,5,6-tetrahydro-2-pyrimidylmethyl alpha-cyclopentyl-p-chlorophenylglycolate hydrochloride*

A solution of 1.7 grams (0.01 mole) of 2-chloromethyl-1,4,5,6-tetrahydropyrimidine hydrochloride in 25 milliliters of isopropanol was neutralized with 5.65 milliliters of 1.77 normal methanolic sodium methylate, and filtered into a solution of 2.5 grams (0.01 mole) of alpha-cyclopentyl-p-chlorophenylglycolic acid in 50 milliliters of isopropanol. Approximately 0.1 gram of potassium iodide was added and the solution was refluxed for 14 hours. The hot solution was filtered and concentrated, whereupon the solid ester hydrochloride separated. It was recrystallized from ethanol-ether to obtain 1.4 grams of white, crystalline solid melting with decomposition at 245–246 degrees centigrade.

*Analysis.*—Calculated for $C_{18}H_{23}ClN_2O_3 \cdot HCl$: N, 7.24; Cl⁻, 9.15. Found: N, 7.17; Cl⁻, 9.09.

*Example 10.*—*1 - methyl - 1,4,5,6 - tetrahydro - 2 - prrimidylmethyl alpha-cyclopentyl-m-bromophenylglycolate hydrochloride*

A solution of 2.5 grams (0.0136 mole) of 1-methyl-2-chloromethyl-1,4,5,6-tetrahydropyrimidine hydrochloride in 25 milliliters of isopropanol was neutralized with 6.7 milliliters of 2.03 normal (0.0136 mole) sodium methylate solution and filtered into a solution of 4.4 grams (0.0147 mole) of alpha-cyclopentyl-m-bromophenylglycolic acid in 50 milliliters isopropanol. A trace of potassium iodide was added, and the resulting mixture was refluxed for 11 hours. Removal of the solvent yielded a gum which was triturated with dry ether to a solid. Two recrystallizations of the solid from ethanol-ether yielded 0.45 gram (7 percent) of the basic ester hydrochloride as a white, crystalline solid melting with decomposition at 204–205 degrees centigrade.

*Analysis.*—Calculated for $C_{19}H_{25}BrN_2O_3 \cdot HCl$: N, 6.29; Cl⁻, 7.93. Found: N, 6.31; Cl⁻, 7.97.

*Example 11.*—*1 - methyl - 1,4,5,6 - tetrahydro - 2 - pyrimidylmethyl alpha cyclopentyl-m-chlorophenylglycolate hydrochloride*

A solution of 3.7 grams (0.02 mole) of 2-chloromethyl - 1 - methyl - 1,4,5,6 - tetrahydropyrimidine in 10 milliliters of isopropanol was neutralized with 9.9 milliliters of 2.03 N sodium methylate in metanol and filtered into a solution of 5.1 grams (0.02 mole) of the crude oily alpha-cyclopentyl-m-chlorophenylglycolic acid in 60 milliliters isopropyl alcohol. Approximately 0.1 gram of potassium iodide was added, the solution was refluxed for 5 hours and distilled to an oil residue. The oil was partitioned between ether and water, the aqueous solution was made alkaline and extracted with ether. The ether solution was dried and treated with etheral hydrogen chloride. The precipitated ester hydrochloride was recrystallized from ethanol-ether to obtain 1.1 grams of white, crystalline solid, melting point 200–201 degrees centigrade.

*Analysis.*—Calculated for $C_{19}H_{25}ClN_2O_3 \cdot HCl$: N, 6.98; Cl⁻, 8.84. Found: N, 6.70; Cl⁻, 8.65.

Following the procedure of Example 10, but starting with alpha-cyclopentyl-o-bromophenylglycolic acid, and with alpha-cyclohexyl-p-bromophenylglycolic acid, the compounds 1-methyl-1,4,5,6-tetrahydro-2-pyrimidylmethyl alpha-cyclopentyl-o-bromophenylglycolate hydrochloride and 1-methyl-1,4,5,6-tetrahydro-2-pyrimidylmethyl alpha-cyclohexyl-p-bromophenylglycolate hydrochloride, respectively, were prepared.

By following the procedure of Example 3, but starting with alpha-cyclohexyl (or cyclopentyl)-o-(or m- or p-)-bromophenylacetic acid, the compounds, 1-methyl-1,4,5,6-tetrahydro - 2 - pyrimidylmethyl alpha-cyclohexyl (or cyclopentyl-o-(or m- or p-), bromophenylacetate hydrochloride were prepared.

By following the procedure of any of the preceding examples, and starting with a bromo, iodo or fluoro-substituted compound corresponding to the chlorophenylglycolic or acetic acid shown, the corresponding bromo, iodo or fluoro-substituted end-product can be prepared.

By following the procedure of any of the preceding examples and starting with a 2-chloromethyl-1,4,5,6-tetrahydropyrimidine hydrochloride wherein the 1-position (or 4 position or both) are substituted by ethyl, propyl, butyl or pentyl, the correspondingly lower-alkyl substituted-tetrahydropyrimidine end-product can be prepared.

To further illustrate the utility of the compounds of the present invention, the following comparisons of some of the compounds of the present invention and various standard drugs is offered:

(A) Estimated $ED_{50}$ (effective dose in 50 percent of the animals) of anti-tremor potency in mice treated with Tremorine:

| Agent: | Dose in mg./kg. of body weight |
|---|---|
| Atropine sulfate | 3.2 |
| Scopolamine | 5.0 |
| Caramiphen | 15.0 |
| Compound of Example 10 | 1.3 |

(B) For inhibition of gastric secretion in the Shay rat the $ED_{50}$ of atropine sulfate was 2.3 mg./kg.; that of Example 10 compound was 1.5 mg./kg.; that of Example 1 compound was 2–3 mg./kg.; that of Example 3 compound was 4–7 mg./kg.; that of Example 5 compound was 4–7 mg./kg.; that of Example 7 compound was 3–4 mg./kg.; that of Example 11 compound was 15–20 mg./kg.

(C) For spasmolytic potency by testing against acetylcholine, by the Magnus method, the $ED_{50}$ of atropine sulfate was 0.0028 mcg./cc. (microgram per 1 cc.) and that of the compound of Example 10 was 0.006 mcg./cc.

(D) For musculotropic activity by testing against barium chloride by the Magnus method, atropine sulfate was inactive, while the compound of Example 10 had an $ED_{50}$ of 0.01 mg./cc.

It is to be understood that our invention is not to be limited to the exact compounds shown, and described, as obvious modifications and equivalents falling within the spirit of our invention will be apparent to one skilled in the art, wherefore our invention is to be limited only by the scope of the appended claims.

We claim:

1. Stable, non-toxic acid addition salts of compounds having the formula:

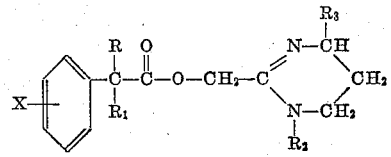

wherein X is a halogen atom; R is selected from the group consisting of hydrogen and hydroxyl; $R_1$ is selected from the group consisting of cyclohexyl and cyclopentyl; $R_2$ and $R_3$ each are selected from the group consisting of hydrogen and lower-alkyl.

2. 1-methyl - 1,4,5,6 - tetrahydro - 2 - pyrimidylmethyl alpha-cyclopentyl-p-chlorophenyl-glycolate hydrochloride.

3. 1,4-dimethyl-1,4,5,6-tetrahydro - 2 - pyrimidylmethyl alpha-cyclopentyl-p-chlorophenylglycolate hydrochloride.

4. 1-methyl - 1,4,5,6 - tetrahydro - 2 - pyrimidylmethyl alpha-cyclohexyl-m-chlorophenylacetate hydrochloride.

5. 1,4-dimethyl-1,4,5,6-tetrahydro - 2 - pyrimidylmethyl alpha-cyclohexyl-p-chlorophenylglycolate hydrochloride.

6. 1-methyl - 1,4,5,6 - tetrahydro - 2 - pyrimidylmethyl alpha-cyclohexyl-p-chlorophenylglycolate hydrochloride.

7. 4-methyl - 1,4,5,6 - tetrahydro - 2 - pyrimidylmethyl alpha-cyclohexyl-p-chlorophenylacetate hydrochloride.

8. 1-methyl - 1,4,5,6 - tetrahydro - 2 - pyrimidylmethyl alpha-cyclopentyl-o-chlorophenylglycolate hydrochloride.

9. 1-methyl - 1,4,5,6 - tetrahydro - 2 - pyrimidylmethyl alpha-cyclohexyl-p-chlorophenylacetate hydrochloride.

10. 1,4,5,6 - tetrahydro-2-pyrimidylmethyl alpha-cyclopentyl-p-chlorophenylglycolate hydrochloride.

11. 1-methyl - 1,4,5,6 - tetrahydro - 2 - pyrimidylmethyl alpha-cyclopentyl-m-bromophenylglycolate hydrochloride.

12. 1-methyl - 1,4,5,6 - tetrahydro - 2 - pyrimidylmethyl alpha-cyclopentyl-m-chlorophenylglycolate hydrochloride.

References Cited in the file of this patent

UNITED STATES PATENTS

| 2,835,676 | Sprague et al. | May 20, 1958 |
| 2,899,436 | Marren | Aug. 11, 1959 |